(12) United States Patent
Tomita

(10) Patent No.: US 7,222,974 B2
(45) Date of Patent: May 29, 2007

(54) LIGHT SOURCE DEVICE AND PROJECTION TYPE DISPLAY DEVICE

(75) Inventor: Hideo Tomita, Tokyo (JP)

(73) Assignee: Sony Corporation, Tokyo (JP)

( * ) Notice: Subject to any disclaimer, the term of this patent is extended or adjusted under 35 U.S.C. 154(b) by 158 days.

(21) Appl. No.: 10/523,079

(22) PCT Filed: Jul. 25, 2003

(86) PCT No.: PCT/JP03/09473

§ 371 (c)(1),
(2), (4) Date: Jan. 27, 2005

(87) PCT Pub. No.: WO2004/011847

PCT Pub. Date: Feb. 5, 2004

(65) Prior Publication Data

US 2005/0248732 A1    Nov. 10, 2005

(30) Foreign Application Priority Data

Jul. 30, 2002    (JP) .............................. 2002-221700

(51) Int. Cl.
*G03B 21/14* (2006.01)
(52) U.S. Cl. .................. 353/94; 385/901; 362/561
(58) Field of Classification Search .............. 353/98, 353/94, 122; 385/133, 901; 362/551, 555, 362/559, 561
See application file for complete search history.

(56) References Cited

U.S. PATENT DOCUMENTS

| | | | | | |
|---|---|---|---|---|---|
| 5,721,795 | A | * | 2/1998 | Pelka | 385/37 |
| 6,547,400 | B1 | * | 4/2003 | Yokoyama | 353/98 |
| 6,688,747 | B2 | * | 2/2004 | Wichner et al. | 353/29 |
| 6,890,108 | B2 | * | 5/2005 | Symanowski et al. | 385/88 |
| 6,988,806 | B2 | * | 1/2006 | Slobodin et al. | 353/31 |
| 7,001,025 | B2 | * | 2/2006 | Engle | 353/94 |
| 7,059,726 | B2 | * | 6/2006 | Engle | 353/81 |
| 2003/0090632 | A1 | * | 5/2003 | Kim et al. | 353/31 |
| 2004/0179776 | A1 | * | 9/2004 | Jenson et al. | 385/31 |
| 2004/0207816 | A1 | * | 10/2004 | Omoda et al. | 353/31 |
| 2005/0179873 | A1 | * | 8/2005 | Yamasaki et al. | 353/94 |

FOREIGN PATENT DOCUMENTS

| | | |
|---|---|---|
| JP | 10-83709 | 3/1998 |
| JP | 2000-124700 | 4/2000 |
| JP | 2000-269549 | 9/2000 |
| JP | 2000-305040 | 11/2000 |
| JP | 2002-133911 | 5/2002 |
| JP | 2002-157904 | 5/2002 |
| JP | 2002-184209 | 6/2002 |

* cited by examiner

*Primary Examiner*—William C. Dowling
(74) *Attorney, Agent, or Firm*—Frommer Lawrence & Haug LLP; William S. Frommer; Thomas F. Presson

(57) ABSTRACT

In a rod-like member 2 through which light can pass, one end 2a is formed as a light exit portion, other surface than this one end 2a is formed as a light reflecting surface 2b and a plurality of LEDs 3 is disposed on the longitudinal direction side surface of the rod-like member 2 of this reflection surface 2b along this longitudinal direction to thereby construct a light source apparatus 1. Thus, a light source with high luminance and high focusing efficiency suitable for use with a projection type display apparatus or the like can be realized by using LEDs.

18 Claims, 9 Drawing Sheets

Shading Produced on Mirror Plane
Lowers Utilization Factor of Light

Shading of LED 3(3) Overlaps That of LED
3(4) And Loss of Light Is Not Produced So
That Loss Can Be Suppressed To Minimum

LIGHT SOURCE DEVICE AND PROJECTION TYPE DISPLAY DEVICE

TECHNICAL FIELD

The present invention relates to a light source apparatus suitable for use as a light source of a projection type display apparatus and the like and a projection type display apparatus using this light source apparatus as a light source thereof.

BACKGROUND ART

Liquid crystal projectors are widely used as a video display apparatus with a large screen by which light modulated on a liquid crystal panel in response to a video signal is projected from a projection lens after light from a light source has been irradiated on a liquid crystal panel.

In a three-chip type liquid crystal projector using three liquid crystal panels corresponding to three colors of R (red), G (green) and B (blue), light from a light source is separated into lights of respective colors of R, G and B by a suitable means such as a dichroic mirror and these lights are irradiated on the liquid crystal panels corresponding to the respective colors R, G and B.

Also, in a single-chip type liquid crystal projector using a single liquid crystal panel, light irradiated on the liquid crystal panel from a light source is separated into lights of respective colors of R, G, and B by a color filter attached to the liquid crystal panel.

So far, a super-high-pressure mercury lamp has been the main stream of the light source of this liquid crystal projector. FIG. 1 is a diagram showing a distribution of a light emission spectrum of a super-high-pressure mercury lamp. The light emission spectrum of the super-high-pressure mercury lamp has energy peaks at a wavelength region ranging from 400 to 480 nm and at a wavelength region ranging from 490 to 550 nm. Light in the wavelength region ranging from 400 to 480 nm is used as blue light and light in the wavelength region ranging from 490 to 550 nm is used as green light. Also, light in the wavelength region ranging from 620 to 700 nm is used as red light.

However, the liquid crystal projector according to the related-art has encountered with the following problems (a) and (b).

(a) As shown in FIG. 1, in the super-high-pressure mercury lamp, intensity of a red light component is relatively low as compared with that of a green light component or a blue light component. Accordingly, while balance of a picture projected from the liquid crystal projector is deviated in the direction of green or blue so that the green light component or the blue light component should be decreased considerably in order to maintain white balance. As a consequence, the liquid crystal projector according to the related art becomes unable to display a picture with sufficiently high luminance.

(b) The life span of the super-high-pressure mercury lamp is relatively short and it lies in a range of from about 1000 to 2000 hours. Therefore, maintenance for changing a light source should be executed comparatively frequently.

While liquid crystal projectors using a metal halide lamp as a light source are available on the market as a liquid crystal projector according to the related art, it is unavoidable that such liquid crystal projector also encounters with the above-described problems (a) and (b).

As one method for solving the problem in which the picture has low luminance because the color components are not uniform in intensity and the problem in which the life span of the light source is short, it is considered to use an LED (light-emitting diode) as a light source of a liquid crystal projector instead of using the discharge lamp such as the super-high-pressure mercury lamp and the metal halide lamp.

That is, since a blue LED becomes commercially available on the market in recent years, the LED can obtain lights of respective colors of R, G, and B with arbitrary intensity each and the life span of such light-emitting diode is considerably long so that it can be energized and de-energized continuously for several 10000s of hours.

However, the LED has remarkably small light emission intensity per unit area as compared with that of the discharge lamp. Therefore, a large number of LEDs should be used to realize a light source with high luminance.

One of the characteristics that should be required by a light source for use with a projection type display apparatus such as a liquid crystal projector may be "light source should have a small emission area as much as possible (light source should be substantially a point source). Hence, when such projection type display apparatus uses a large number of LEDs, it becomes important to optically focus lights from the respective LEDs with high efficiency.

Official gazette of Japanese laid-open patent application 2000-112031 discloses a light source apparatus in which light from an LED array 102 with a plurality of LEDs 101 arrayed thereon in a two-dimensional fashion is reflected on a hollow optical guide block 103 with the same sectional area as that of the LED array 102 and in which reflected light is emitted from the cross-section of this optical guide block 103 as shown in FIG. 2.

However, according to this light source apparatus, since the light emission area (cross-section of the optical guide block 103) is the same as the area of the LED array 102, if the number of LEDs 101 is increased to increase luminance, then the light emission area is widened considerably. Accordingly, it is not possible to optically focus lights from a large number of LEDs with high efficiency.

In view of the aforesaid aspect, it is an object of the present invention to realize a light source with high luminance and high focusing efficiency suitable for use with a projection type display apparatus or the like by using LEDs.

DISCLOSURE OF THE INVENTION

To solve this problem, a light source apparatus according to the present invention is characterized in that the light source includes a rod-like member in which light can be passed through the inside thereof, one end thereof being formed as a light exit portion, other surface than said one end being formed as a light reflecting surface, a plurality of light-emitting diodes being disposed on the rod-like member at its longitudinal direction side surface of the reflecting surface along the longitudinal direction.

In this light source apparatus, of the rod-like member through which light can be traveled, one end is formed as the light exit portion and the remaining surface is formed as the light reflecting surface. Then, a plurality of LEDs is disposed on the longitudinal direction side surface of this rod-like member along the longitudinal direction of this rod-like member.

Light beams generated from these LEDs are passed through the inside of this rod-like member and are repeatedly reflected on the reflecting surface of this rod-like member. Then, they are emitted from the light exit portion of this rod-like member finally.

As described above, in this light source apparatus, light beams from a plurality of LEDs are all emitted from one end of one rod-like member (that is, the area of one end of this rod-like member becomes the light emission area). This light emission area can be decreased sufficiently by using a long and slender member as a rod-like member. Also, this light emission area can be prevented from being changed even if the number of LEDs is increased in order to increase luminance.

In consequence, a light source with high luminance and high focusing efficiency (a light source close to a point source) suitable for use with a projection type display apparatus or the like can be realized by using the LEDs.

Further, a light source apparatus according to the present invention is characterized in that these LEDs are disposed at substantially an equal interval. Also, a light source apparatus according to the present invention is characterized in that a distance between a LED nearest the end face of the rod-like member in the opposite side of the light exit portion of the LED and this end face is substantially a half of the interval between these adjacent LEDs.

The reason for this will be described below. Although light beams generated from the LEDs are repeatedly reflected on the reflecting surface and emitted from the light exit portion as mentioned before, when light beams reach the LEDs on the reflecting surface, they are absorbed on the reflecting surface and hence they cannot be emitted from the light exit portion. Therefore, in order to improve utilization factor of light, it becomes important to decrease a quantity of light lost when light is absorbed in the inside of this light source apparatus (in the inside of the rod-like member).

Then, since the LEDs are disposed at the equal interval, shading produced when light beams from the LED are absorbed by other LED is further overlapped with other LED.

Also, the distance between the LED nearest the end face of the rod-like member on the opposite side of the light exit portion and the end face is selected to be substantially half, whereby shading produced when light beams from the LED are absorbed by other LED after they were reflected on this end face is further overlapped with other LED.

As described above, since the shading produced when light beams are absorbed by the LED is overlapped with other LED, light is not lost in the inside of the LED with which the above shading is overlapped. As a result, a quantity of light lost when light beam is absorbed within the light source apparatus can be suppressed to the minimum and it becomes possible to increase the utilization factor of light.

Further, a light source apparatus according to the present invention is characterized in that these LEDs are red LEDs.

Also, a light source apparatus according to the present invention is characterized in that these LEDs are white LEDs.

Also, a light source apparatus according to the present invention is characterized in that this rod-like member is extended in such a manner that one end serving as the light exit portion may be curved.

Also, a light source apparatus according to the present invention is characterized in that this rod-like member is hollow and that the inside of the surface other than one end is formed as a light reflecting surface.

Further, a light source apparatus according to the present invention is characterized in that this rod-like member is a solid transparent member, this rod-like member having a recess formed on its longitudinal direction side surface to dispose the LED therein, other portion than the recess in other surface than one end being formed as a light reflecting surface.

In a projection type display apparatus in which light from a light source is irradiated on a light modulator device, light modulated by the light modulator device in response to a video signal being projected from a projection lens, a projection type display apparatus according to the present invention is characterized in that the light source includes a rod-like member in which light can be passed through the inside thereof, one end thereof being formed as a light exit portion, other surface than one end being formed as a light reflecting surface, a plurality of light-emitting diodes being disposed on the rod-like member at its longitudinal direction side surface of the reflecting surface along the longitudinal direction.

This projection type display apparatus uses the aforementioned light source apparatus according to the present invention. Accordingly, since the light source can be formed with high luminance and also can be formed as substantially the point source, lights of respective colors R, G and B can be obtained with arbitrary luminance. Thus, while white balances is being maintained, this projection type display apparatus can display pictures with sufficiently high luminance and frequency at which maintenance for exchanging a light source can be decreased.

Further, a projection type display apparatus according to the present invention is characterized in that these LEDs are disposed at substantially an equal interval. Also, this projection type display apparatus is characterized in that a distance between the LED nearest the end face of the rod-like member in the opposite side of the light exit portion of the LED and the end face is substantially a half of the interval between these LEDs.

As a consequence, a quantity of light lost when light is absorbed in the inside of the light source can be suppressed to the minimum and hence the utilization factor of light in the whole of the projection type display apparatus can be improved.

Further, the projection type display apparatus according to the present invention is characterized in that these LEDs are white light LEDs.

Also, a projection type display apparatus according to the present invention is characterized in that the light source is composed of a red light source containing only a red component, a green light source containing only a green component and a blue light source containing only a blue component.

Also, a projection type display apparatus according to the present invention is characterized in that the projection type display apparatus includes a reflector for reflecting light emitted from this light source to provide parallel light, the rod-like member being extended in such a manner that one end serving as the light exit portion being curved and this light exit portion being disposed so as to oppose this reflector.

A projection type display apparatus according to the present invention is characterized in that the rod-like member is hollow, the inside of the surface other than the one end being formed as a light reflecting surface.

Also, a projection type display apparatus according to the present invention is characterized in that this rod-like member is a solid transparent member, the rod-like member having a recess formed on its longitudinal direction side surface to dispose these LEDs therein, other portion than the recess in other surface than the one end being formed a light reflecting surface.

Next, in a projection type display apparatus in which light from a light source is irradiated on a light modulator device, light modulated by the light modulator device in response to a video signal being projected from a projection lens, a projection type display apparatus according to the present invention is characterized in that the light source is composed of a first light source and a second light source having an emission spectrum different from that of the first light source, the light source includes a replacement optical system for replacing light of a specific wavelength band of light beams from the first light source with light beams from the second light source, the second light source includes a rod-like member in which light can be passed through the inside thereof, one end thereof being formed as a light exit portion, other surface than the one end being formed as a light reflecting surface, a plurality of LEDs being disposed on the rod-like member at its longitudinal direction side surface of the reflecting surface along the longitudinal direction.

This projection type display apparatus can obtain only light of the specific wavelength band from the second light source having the arrangement of the aforementioned light source apparatus according to the present invention.

Further, a projection type display apparatus according to the present invention is characterized in that these LEDs are disposed at substantially an equal interval and it is also characterized in that a distance between the LED nearest the end face of the rod-like member in the opposite side of the light exit portion of the LED and the end face is substantially a half of the interval between the adjacent LEDs.

Furthermore, a projection type display apparatus according to the present invention is characterized in that this second light source is composed of a red light LED.

BEST MODE FOR CARRYING OUT THE INVENTION

The present invention will be described below in concrete with reference to the drawings.

Figure 1:
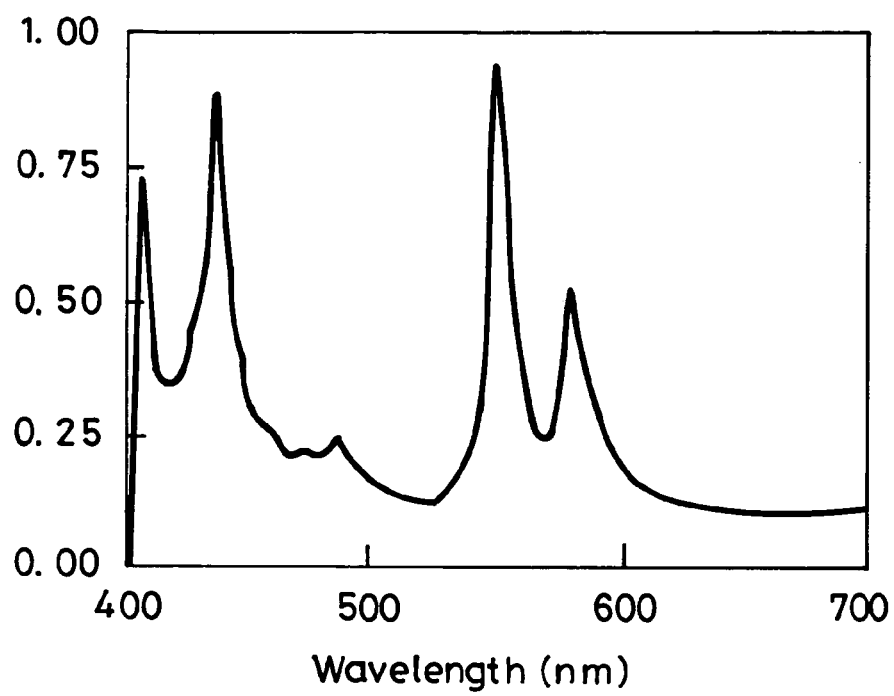
FIG. 1 is a diagram showing an emission spectrum distribution of a super-high-pressure mercury lam.
Figure 2:
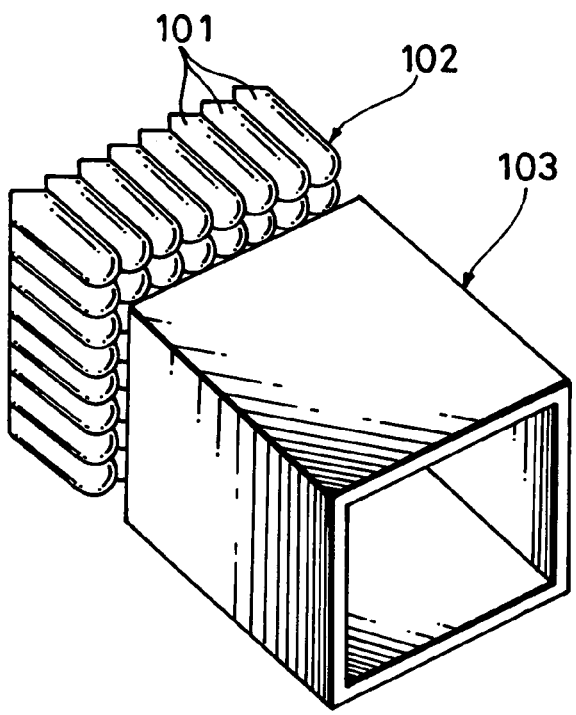
FIG. 2 is a diagram showing an existing light source apparatus using an LED.
Figure 3:
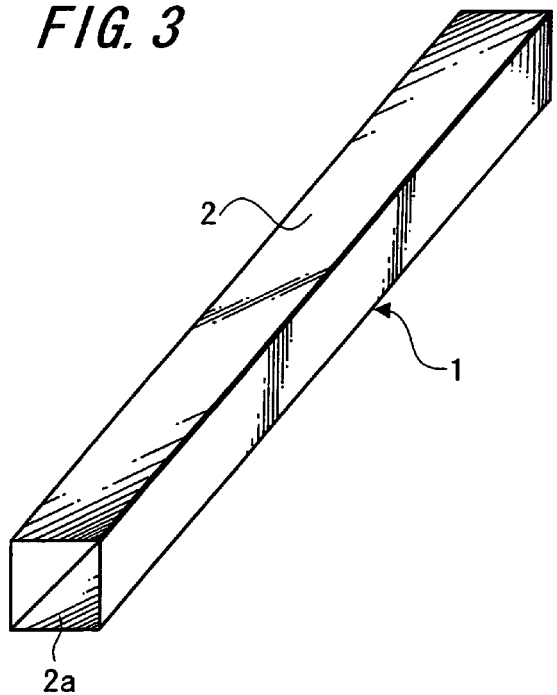
FIG. 3 is a perspective view showing an example of an outward arrangement of a light source apparatus according to the present invention.

FIG. 3 is a perspective view showing an example of an outward arrangement of a light source apparatus according to the present invention. This light source 1 is constructed by using a rod 2 that is a long and slender quadrangular prism-like member. The rod 2 is hollow and one end thereof is formed as an opening 2a. One side of the opening 2a is approximately 2 mm.

Figure 4:
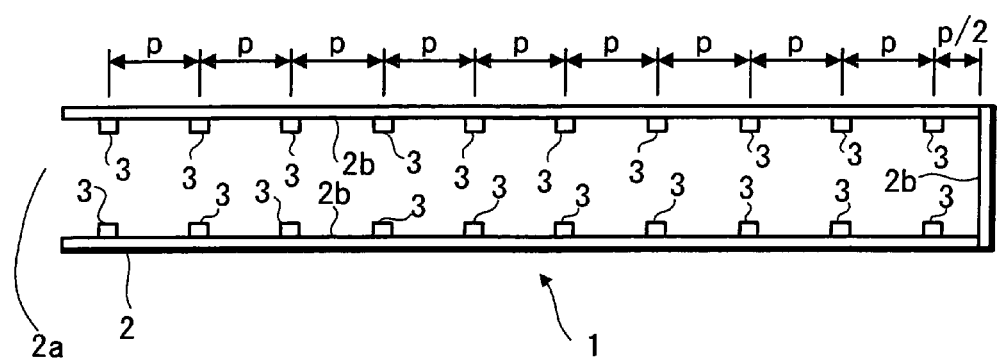
FIG. 4 is a cross-sectional view showing an inside structure of the light source apparatus according to the present invention.

FIG. 4 is a cross-sectional view showing the internal structure of this light source apparatus 1. The inside surface of the rod 2 is formed as a mirror plane 2b finished by vapor-deposition of a suitable material such as silver or aluminum. 10 LEDs 3 each are disposed on four side surfaces of the mirror plane 2b along the longitudinal direction of the rod 2 at an equal distance p (only 10 LEDs 3 each disposed on the two side surfaces of the four side surfaces are shown in the sheet of drawing). A length from the LED 3 nearest the end face of the opposite side of the opening 2a to this end face is selected to be p/2 which is the half of the distance p between the adjacent LEDs 3.

Figure 5:
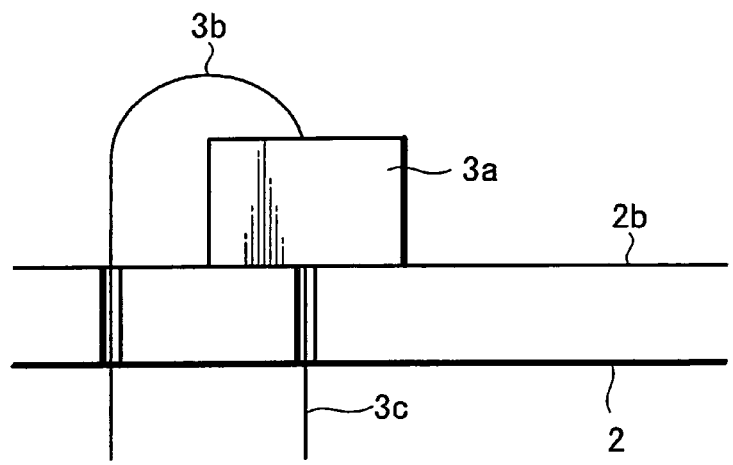
FIG. 5 is a diagram showing the part of FIG. 4 in an enlarged-scale.

FIG. 5 is a schematic diagram showing the portion in which the LED 3 is disposed in FIG. 4 in an enlarged-scale. An LED chip 3a is attached to the mirror plane 2b by adhesives (not shown), and lead wires 3b, 3c for connecting the LED chip 3a to a driver circuit (not shown) are extended through the side surface of the rod 2. The lead wires 3b, 3c are not shown in FIGS. 3 and 4.

Figure 6:
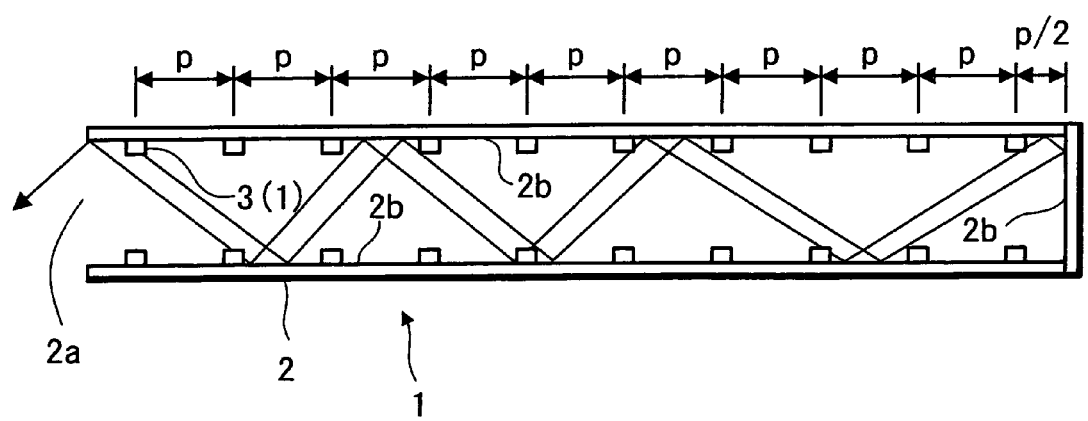
FIG. 6 is a diagram showing the manner in which light is emitted from the light source apparatus according to the present invention.

The manner in which light is emitted from this light source apparatus 1 will be described below. When the LEDs 3 are energized at the same time, light beams emitted from each LED 3 are passed through the hollow inside of the rod 2, reflected on the mirror plane 2b repeatedly and then they are emitted from the opening 2a finally. FIG. 6 shows the LEDs 3, in particular, an example of the LED 3 (1) located nearest the opening 2a and it also shows the manner in which light beams emitted from the LED 3 (1) toward the opposite direction of the opening 2a are emitted from the opening 2a after they were repeatedly reflected on the mirror plane 2b as described above.

In this manner, according to this light source apparatus 1, light beams from the 40 LEDs 3 in total are all emitted from the opening 2a of one end of the rod 2 (that is, the area of the opening 2a of the rod 2 becomes a light-emission area). Then, since one side of the opening 2a is approximately 2 mm as mentioned before, this light-emission area is sufficiently small. While the 40 LEDs in total are used herein, if the number of the LEDs 3 is increased in excess of 40 in order to increase luminance much more, then this light-emission area will not be changed.

Thus, the light source with high luminance and high converging efficiency (this light source is close to a point source) suitable for use with a projection type display apparatus or the like is realized by using the LEDs.

Further, this light source apparatus 1 has a high utilization factor of light from the following reason. That is, although the light beam generated from the LED 3 is repeatedly reflected on the mirror plane 2b and emitted from the opening 2a as mentioned hereinbefore, when it reaches the LED 3 on the mirror plane 2$b$, it is absorbed there and hence it cannot be emitted from the opening 2$a$. Accordingly, in order to improve the utilization factor of light, it becomes important to decrease a quantity of light lost when light is absorbed in the inside of this light source apparatus 1 (within the rod 2).

Figure 7:
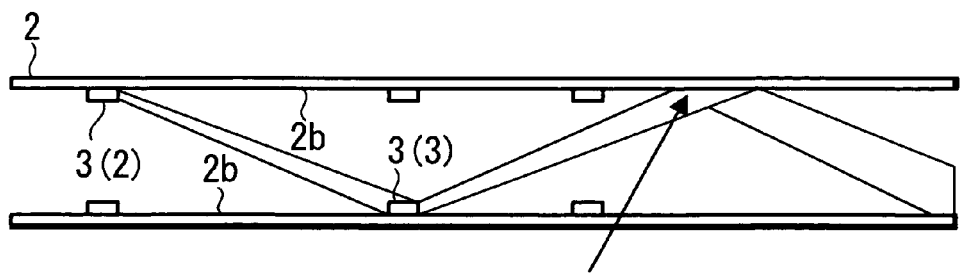
FIG. 7 is a diagram used to explain the manner in which light is lost when light beams are absorbed by the LED.

If the LED 3 is not located at the equal distance, then as shown in FIG. 7, the light beam from a certain LED 3 (2) is absorbed by other LED 3 (3) so that shading appears on the mirror plane 2$b$. Thus, it is unavoidable that a quantity of light lost when light is absorbed in the inside of the light source apparatus will increase.

Figure 8:
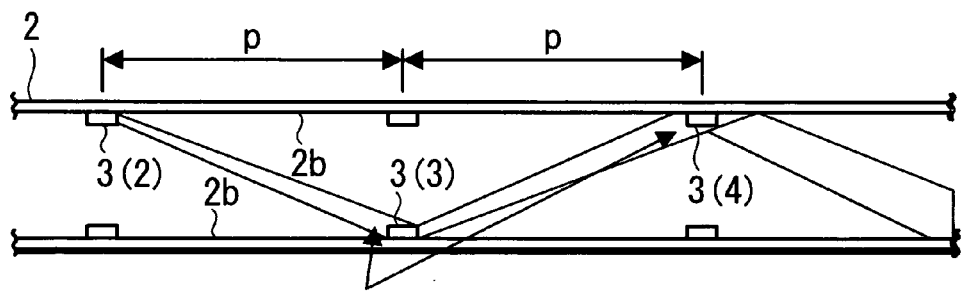
FIG. 8 is a diagram used to explain the manner in which light is lost when light beams are absorbed by the LED.

On the other hand, in this light source apparatus 1, since the LED 3 is located at the equal interval p, shading produced when a light beam from a certain LED 3 (2) is absorbed by other LED 3 (3) is overlapped with a further LED 3 (4) as shown in FIG. 8.

Figure 9:
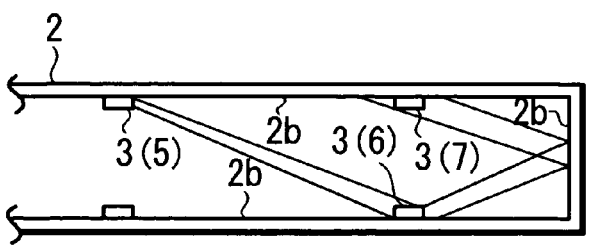
FIG. 9 is a diagram used to explain the manner in which light is lost when light beams are absorbed by the LED.

Also, since the length between the LED 3 nearest the end face (mirror plane 2$b$) of the rod 2 of the opposite side of the opening 2$a$ and its end face is p/2 which is the half of the distance p between the LEDs, as shown in FIG. 9, shading caused when a light beam from a certain LED 3 (5) is absorbed by other LED 3 (6) after it was reflected on this end face also is further overlapped with other LED 3 (7).

As described above, since shading caused when the light beam is absorbed by the LED 3 is overlapped with other LED 3, a light loss caused by the absorption of light does not occur in the LED 3 following the LED 3 with which the shading was overlapped. Hence, a quantity of light lost when light is absorbed in the inside of the light source apparatus can be suppressed to the minimum. Accordingly, the utilization factor of light can be increased.

Figure 10:
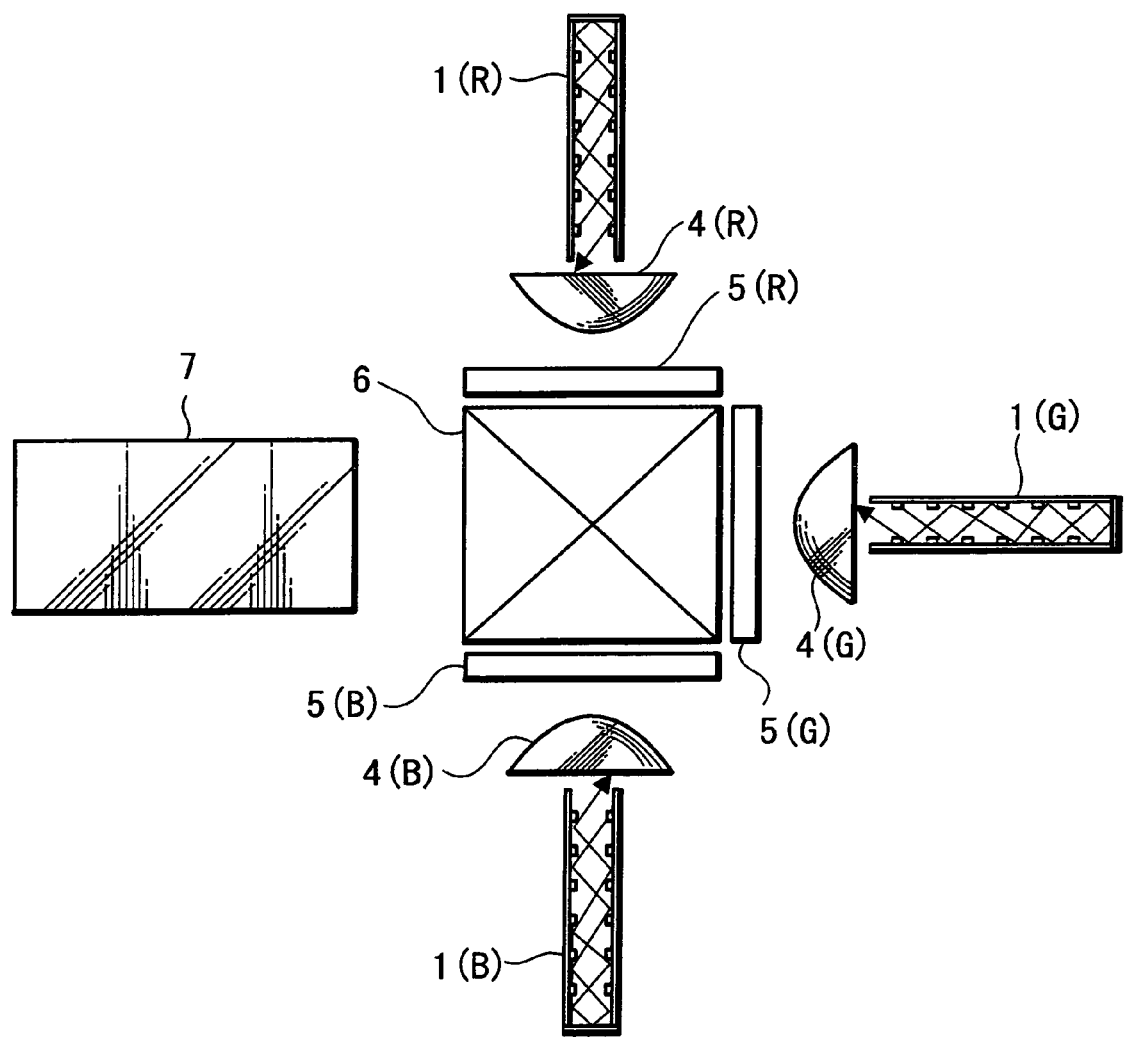
FIG. 10 is a diagram showing an example of an arrangement of an optical system of a three-chip type liquid crystal projector according to the present invention.

Next, FIG. 10 is a diagram showing an example of an arrangement of an optical system of a three-chip type liquid crystal projector according to the present invention. This three-chip type liquid crystal projector is provided with a light source apparatus 1 (R), a light source apparatus 1 (G) and a light source apparatus 1 (B).

While the respective light source apparatus 1 (R), 1 (G), 1 (B) are the same in arrangement as that of the light source apparatus 1 shown in FIGS. 3 to 5, they use a red LED, a green LED, a blue LED as the LED 3, respectively (although these light apparatus are illustrated in the form of cross-sectional views like FIG. 4, the number of LEDs is made different from that of FIG. 4 for convenience sake of illustration and it is less than 10. This relationship applies for FIGS. 11 to 14, which will be described later on, as well).

When intensities of lights from these red LED, green LED and blue LED are different from each other, the number of LEDs of the respective light source apparatus 1 (R), 1 (G), 1 (B) is adjusted in such a manner that intensities of red light, green light, blue light emitted from the light source apparatus 1 (R), 1 (G), 1 (B) may become substantially equal to each other (for example, when intensities of light of the green LED and the blue LED are smaller than that of light of the red LED, the number of the LEDs of the light source apparatus 1 (G), 1 (B) may be increased in excess of the number of the LEDs of the light source apparatus 1 (R)).

As shown in FIG. 10, red light, green light, blue light emitted from the respective light source apparatus 1 (R), 1 (G), 1 (B) are converted into parallel lights by condensing lenses 4 (R), 4 (G), 4 (B) and irradiated on liquid crystal panels 5 (R), 5 (G), 5 (B) corresponding to red light, green light, blue light, respectively.

Then, red light, green light, blue light, which were respectively modulated in response to red, green, blue video signals R, G and B by the liquid crystal panels 5 (R), 5 (G), 5 (B), are synthesized by a dichroic prism 6 and emitted from a projection lens 7 to the outside.

In this three-chip type liquid crystal projector, since the light source apparatus 1 (R), i (G), 1 (B) serving as the light sources are high in luminance, they are substantially close to the point sources and intensities of red light, green light, blue light from these light source apparatus are equal to each other, this three-chip type liquid crystal projector can display pictures with sufficiently high luminance while white balance is being maintained. Also, since the LED is long in life span, it is sufficient that frequency of maintenance for exchanging light sources should be decreased.

Further, since a quantity of light lost when light is absorbed in the insides of the light source apparatus 1 (R), 1 (G), 1 (B) can be suppressed to the minimum; it is possible to increase the utilization factor of light of the whole of the liquid crystal projector.

Figure 11:
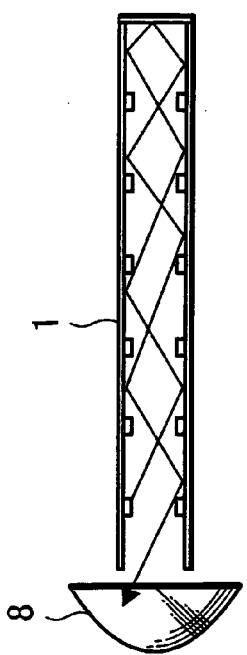
FIG. 11 is a diagram showing an example of an arrangement of an optical system of a single-chip type liquid crystal projector according to the present invention.
Figure 11:
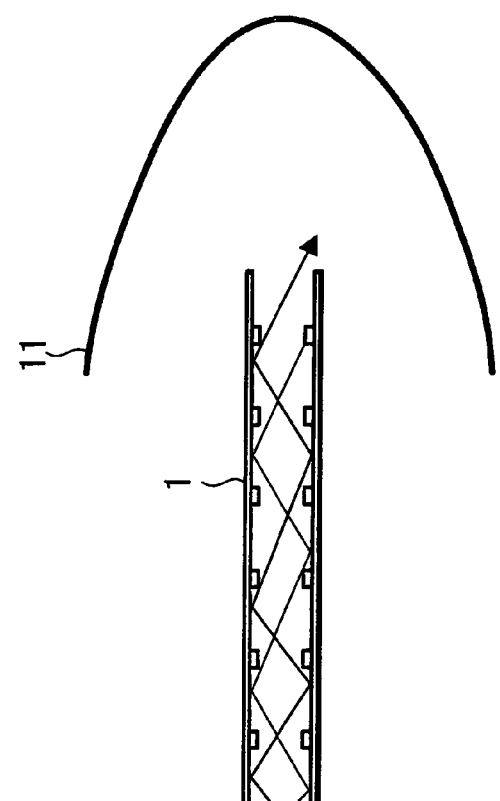
Figure 11:
Figure 11:
Figure 11:
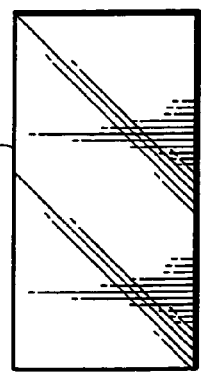

Next, FIG. 11 is a diagram showing an example of an arrangement of an optical system of a single-chip type liquid crystal projector according to the present invention. This single-chip type liquid crystal projector is provided with the light source apparatus 1 having the arrangement shown in FIGS. 3 to 5 as a light source thereof. Here, the light source apparatus 1 uses a white LED as the LED 3 (alternatively, the number of the red LED, the green LED, the blue LED may be adjusted in such a manner that intensities of light of red light, green light, blue light emitted from the light source apparatus 1 may become substantially equal to each other).

Light emitted from the light source apparatus 1 is converted into parallel light by a condensing lens 8, irradiated on a liquid crystal panel 9 and it is separated into red light, green light, blue light by a color filter attached to the liquid crystal panel 9.

Then, red light, green light, blue light, which were modulated in response to the red, green, blue video signals R, G and B by the liquid crystal panel 9, are emitted from a projection lens 10 to the outside.

Also in this single-chip type liquid crystal projector, since the light sources is high in luminance, it is substantially close to the point source, this single-chip type liquid crystal projector can display pictures with sufficiently high luminance while white balance is being maintained. Also, since it is sufficient that frequency of maintenance for exchanging the light source should be decreased, and it is possible to improve the utilization factor of light on the whole of the liquid crystal projector.

Figure 12:
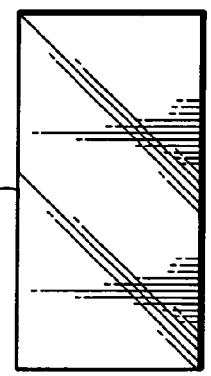
FIG. 12 is a diagram showing a modified example of the arrangement of the optical system shown in FIG. 11.
Figure 13:
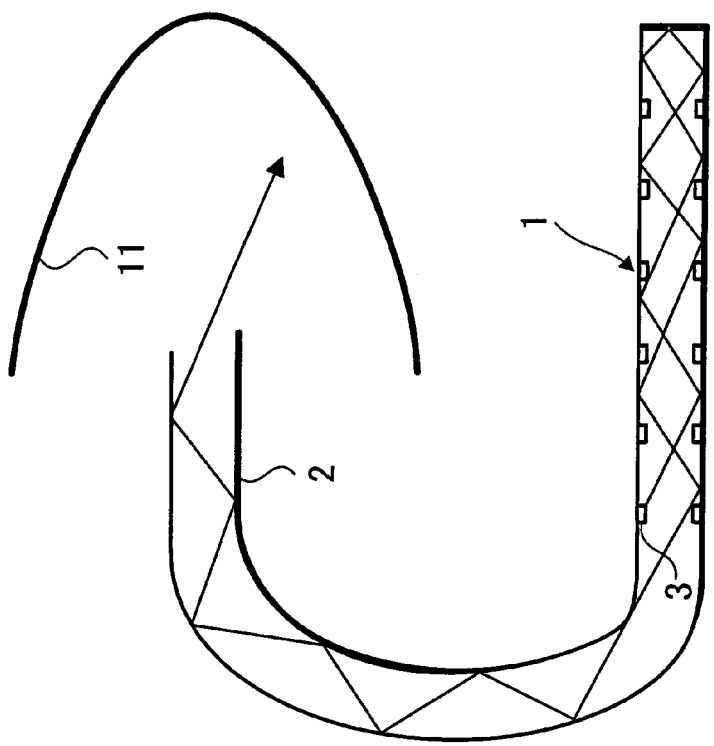
FIG. 13 is a diagram showing a modified example of the arrangement of the optical system shown in FIG. 12.
Figure 13:
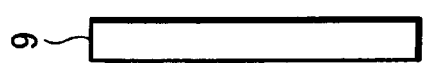
Figure 13:
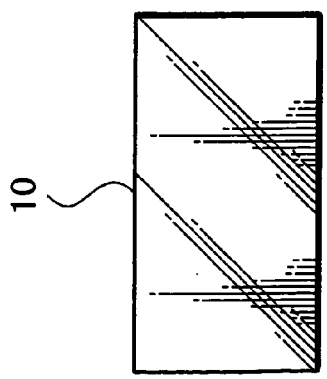

While the light emitted from the light source apparatus is converted into the parallel light by the condensing lens in the examples of FIGS. 10 and 11, the present invention is not limited thereto, and alternatively, light emitted from the light source apparatus may be reflected by a reflector and thereby converted into parallel light. FIG. 12 is a diagram showing an example of a modified arrangement of the single-chip type liquid crystal projector shown in FIG. 11, wherein elements and parts identical to those of FIG. 11 are denoted by the identical reference numerals. Light emitted from the light source apparatus 1 is converted into parallel light by a reflector 11 and irradiated on the liquid crystal panel 9.

Also, when the light emitted from the light source apparatus is reflected by the reflector as described above, as shown in FIG. 13, a tip end (end portion of the opening 2$a$) of the rod 2 of the light source apparatus 1 may be curved 180° and extended, whereby the main body (portion in which the LED 3 is located) of the rod 2 may be located in the lateral direction of the reflector 11.

While all of red light, green light, blue light is generated from the light source apparatus according to the present invention in the example of FIG. 10, the present invention is not limited thereto. Alternatively, green light and blue light may be generated from the super-high-pressure mercury lamp or the metal halide lamp, and in this discharge lamp, only red light of which intensity is low may be generated from the light source apparatus according to the present invention.

Figure 14:
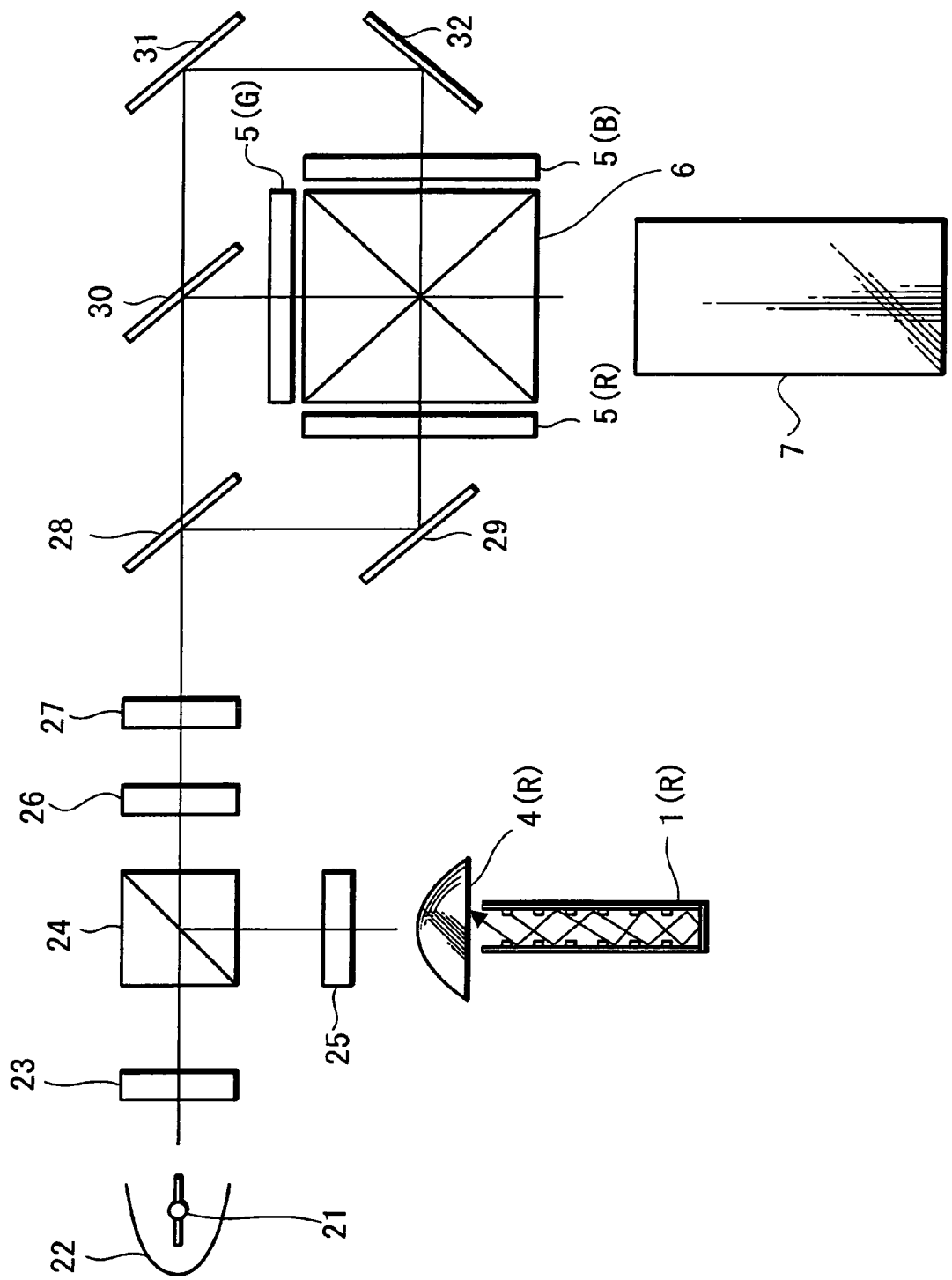
FIG. 14 is a diagram showing a modified example of the arrangement of the optical system shown in FIG. 10.

FIG. 14 is a diagram showing an example of an optical system of a three-chip type liquid crystal projector using such arrangement, in which elements and parts identical to those of FIG. 10 are denoted by the identical reference numerals. Light emitted from a super-high-pressure mercury lamp 21 is reflected by a reflector 22 and thereby converted into parallel light, whereafter this parallel light is introduced into a polarizing conversion device 23. The polarizing conversion device 23 is adapted to polarize all of incident lights to provide P-polarized light, and the P-polarized light emitted from the polarizing conversion device 23 is introduced into a PS separating and synthesizing device 24.

On the other hand, red light emitted from the light source apparatus 1 (R) is converted into parallel light by the condensing lens 4 (R) and introduced into a polarizing conversion device 25. The polarizing conversion device 25 is adapted to polarize all of incident lights to provide S-polarized light, and S-polarized light from the polarizing conversion device 25 also is introduced into the PS separating and synthesizing device 24.

The P-polarized light from the polarizing conversion device 23 and the S-polarized light from the polarizing conversion device 25 are synthesized by the PS separating and synthesizing device 24 and thereby introduced into a polarizing rotator device 26.

The polarizing rotator device 26 is adapted to change the polarization direction of light in the red wavelength band 90° and is also adapted to pass light in other wavelength regions as it is. This polarizing rotator device 26 is adapted to polarize red light of the P-polarized light (light from the super-high-pressure mercury lamp 21) from the polarizing conversion device 23 to provide S-polarized light and is also adapted to polarize the S-polarized light (red light from the light source apparatus 1 (R)) from the polarizing conversion device 25 to provide P-polarized light.

Light emitted from the polarizing rotator device 26 is introduced into a sheet polarizer 27 which passes only P-polarized light. Red light (S-polarized light) of light from the super-high-pressure mercury lamp 21 is blocked by this sheet polarizer 27.

Red light of light emitted from the sheet polarizer 27 (green light and blue light from the super-high-pressure mercury lamp 21 and red light from the light source apparatus 1 (R)) is reflected by a dichroic mirror 28, reflected by a mirror 29 and is thereby irradiated on the liquid crystal panel 5 (R).

Also, green light of light emitted from the sheet polarizer 27 is passed through the dichroic mirror 28, reflected by a dichroic mirror 30 and is thereby irradiated on the liquid crystal panel 5 (G).

Further, blue light from light emitted from the sheet polarizer 27 is passed through the dichroic mirrors 28, 30, reflected by mirrors 31, 32 and is thereby irradiated on the liquid crystal panel 5 (B).

This three-chip type liquid crystal projector becomes able to display pictures with sufficiently high luminance by replacing a red light component with low intensity of light from the super-high-pressure mercury lamp 21 with light from the red LED of the light source apparatus 1 (R) while white balance is being maintained.

While the light source apparatus 1 is constructed by using the quadrangular-prism-like rod 2 in the above-mentioned examples, the present invention is not limited thereto. Alternatively, it is possible to use polygonal-prism-like (triangular-prism-like, pentagonal-prism-like, etc.) rods other than the quadrangular-prism-like rod or a cylindrical rod.

Figure 15:
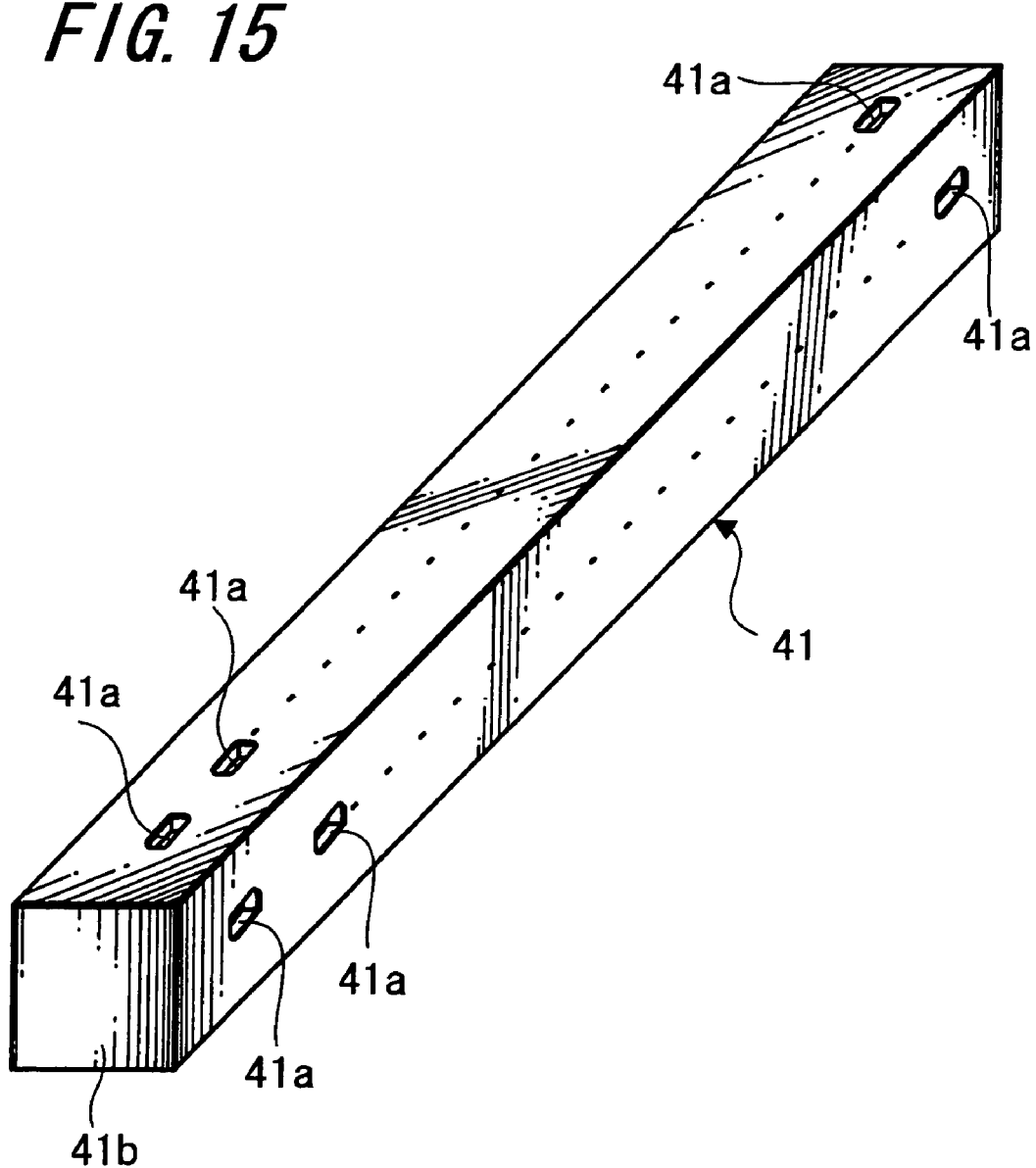
FIG. 15 is a perspective view showing a modified example of a material of a rod.

While the light source 1 is constructed by using the rod 2 which is hollow and of which one end is opened in the above-mentioned examples, the present invention is not limited thereto. Alternatively, it is possible to use a rod of a solid transparent member such as a glass rod. In that case, as shown in FIG. 15, for example, a plurality of recesses 41a for disposing the LEDs may be formed on each side wall extended along the longitudinal direction of a glass rod 41. Then, under the state in which the portions of the recesses 41a are masked, after other surfaces than one end face 41b of the glass rod 41 were treated by vapor-deposition of a suitable material such as silver or aluminum (these surfaces were finished as mirror planes), LEDs may be buried into those recesses 41a.

While the present invention is applied to the liquid crystal projector in the above-mentioned examples, the present invention is not limited thereto and may be applied to other projection type display apparatus (for example, projection type display apparatus using a DMD (digital mirror device) as a spatial light modulator device thereof) than the liquid crystal projector.

Also, the present invention is not limited to the above-mentioned examples and may take various other arrangements without departing from the gist of the present invention.

As described above, according to the light source apparatus of the present invention, there can be achieved the effect in which a light source with high luminance and high focusing efficiency (this light source is substantially close to the point source) suitable for the projection type display apparatus or the like can be realized by using the LEDs.

Also, there can be achieved the effect in which a quantity of light lost when light is absorbed within the light source apparatus can be suppressed to the minimum to thereby improve the utilization factor of light.

Next, according to the projection type display apparatus of the present invention, there can be achieved the effects in which the light source can be formed as the light source with high luminance and which is substantially close to the point source, in which pictures with sufficiently high luminance can be displayed while white balance is being maintained and in which frequency of maintenance for exchanging a light source can be decreased.

Further, there can be achieved the effect in which a quantity of light lost when light is absorbed within the light source can be suppressed to the minimum to thereby increase the utilization factor of light of the whole of the display apparatus.

The invention claimed is:

1. A light source apparatus, comprising:
   an elongated member, having an interior surface, adapted to allow light to pass through;
   an open end of said elongated member adapted to allow light to escape said elongated member;
   a closed end of said elongated member, opposite said open end, adapted to reflect light; and
   a plurality of light-emitting diodes, positioned at substantially equal intervals, located in a longitudinal direction on the interior surface of said elongated member.

2. The apparatus according to claim 1,
wherein light-emitting diodes located nearest the closed end of the elongated member are positioned at a distance away from the closed end that is substantially one half of the substantially equal intervals.

3. The apparatus according to claim 1, wherein said light-emitting diodes are red light-emitting diodes.

4. The apparatus according to claim 1, wherein said light-emitting diodes are white light-emitting diode.

5. The apparatus according to claim 1, wherein said elongated member is elongated in such a manner so that a portion nearest the open end is curved.

6. The apparatus according to claim 1, wherein said elongated member is hollow and the interior surfaces other than the open end are light-reflecting surfaces.

7. The apparatus according to claim 1,
wherein said elongated member is composed of a solid transparent material, and
wherein said elongated member has recesses formed on its longitudinal side surfaces to dispose said light-emitting diodes, and portions of the elongated member other than said recesses and said open end are light-reflecting surfaces.

8. A projection apparatus, comprising:
a light source adapted to irradiate light, comprising:
an elongated member, having an interior surface, adapted to allow light to pass through;
an open end of said elongated member adapted to allow light to escape said elongated member;
a closed end of said elongated member, opposite said open end, adapted to reflect light; and
a plurality of light-emitting diodes, positioned at substantially equal intervals, located in a longitudinal direction on the interior surface of said elongated member;
a light modulator adapted to modulate the light irradiated from the light source in response to a video signal; and
a projection lens for projecting the modulated light.

9. The apparatus according to claim 8,
wherein light-emitting diodes located nearest the closed end of the elongated member are positioned at a distance away from the closed end that is substantially one half of the substantially equal intervals.

10. The apparatus according to claim 8, wherein said light-emitting diodes are white light-emitting diodes.

11. The apparatus according to claim 8, wherein said light source is composed of a red light source containing only a red component, a green light source containing only a green component, and a blue light source containing only a blue component.

12. The apparatus according to claim 8, wherein said elongated member is elongated in such a manner so that a portion closets to the open end is curved.

13. The apparatus according to claim 8, wherein said elongated member is hollow and the interior surfaces other than the open end are light-reflecting surfaces.

14. The apparatus according to claim 8,
wherein said elongated member is composed of a solid transparent material, and
wherein said elongated member has recesses formed on its longitudinal side surfaces to dispose said light-emitting diodes, and portions of the elongated member other than said recesses and said open end are light-reflecting surfaces.

15. The apparatus according to claim 8, further comprising:
a reflector for reflecting light emitted from said light source to provide parallel light,
wherein said elongated member is elongated in such a manner that said open end is curved and said open end is positioned opposite said reflector.

16. A projection apparatus, comprising:
a light source comprising:
a first light source and a second light source, said second light source having an emission spectra different from an emission spectra of said first light source; and an optical system for replacing light of a specific wavelength band from said first light source with light from said second light source,
said second light-source comprising:
an elongated member, having an interior surface, adapted to allow light to pass through;
an open end of said elongated member adapted to allow light to escape said elongated member;
a closed end of said elongated member, opposite said open end, adapted to reflect light; and
a plurality of light-emitting diodes, positioned at substantially equal intervals, located in a longitudinal direction on the interior surface of said elongated member;
a light modulator adapted to modulate the light irradiated from the light source in response to a video signal; and
a projection lens for projecting the modulated light.

17. The apparatus according to claim 16,
wherein light-emitting diodes located nearest the closed end of the elongated member are positioned at a distance away from the closed end that is substantially one half of the substantially equal intervals.

18. The apparatus according to claim 16, wherein said second light source is composed of red light-emitting diodes.

* * * * *